US011676170B2

(12) United States Patent
Garg et al.

(10) Patent No.: US 11,676,170 B2
(45) **Date of Patent: *Jun. 13, 2023**

(54) SYSTEM AND METHOD FOR PROCESSING OF PROMOTIONS IN CONNECTION WITH DIGITAL PURCHASING

(71) Applicant: Synchrony Bank, Stamford, CT (US)

(72) Inventors: Rinki Garg, Khurja (IN); James Wallace, Dayton, OH (US); Jonathan Schmidt, Beavercreek, OH (US); Taylor Young, Slidell, LA (US); Prakash Kothandapani, Miamisburg, OH (US); Rajasekhara Palanki, Miamisburg, OH (US); Deborah Bernert, Stamford, CT (US); Jennifer Muller, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/354,437

(22) Filed: Jun. 22, 2021

(65) Prior Publication Data

US 2022/0044275 A1 Feb. 10, 2022

Related U.S. Application Data

(63) Continuation of application No. 15/387,993, filed on Dec. 22, 2016, now Pat. No. 11,074,605.

(51) Int. Cl.

| | |
|---|---|
| ***G06Q 30/02*** | (2023.01) |
| ***G06Q 30/0207*** | (2023.01) |
| ***G06Q 30/0601*** | (2023.01) |

(52) U.S. Cl.

CPC ..... *G06Q 30/0239* (2013.01); *G06Q 30/0601* (2013.01)

(58) Field of Classification Search

CPC ....................... G06Q 30/0239; G06Q 30/0601

See application file for complete search history.

(56) References Cited

U.S. PATENT DOCUMENTS

| | | | | |
|---|---|---|---|---|
| 7,624,038 B1 | | 11/2009 | Wood et al. | |
| 8,005,426 B2 | * | 8/2011 | Huomo | G06Q 20/20 235/441 |

(Continued)

OTHER PUBLICATIONS

Office Action dated Aug. 31, 2018 in U.S. Appl. No. 15/387,993.

(Continued)

*Primary Examiner* — Michael I Ezewoko
(74) *Attorney, Agent, or Firm* — Polsinelli LLP

(57) ABSTRACT

A system and method for processing promotions in connection with digital purchasing. Data associated with a digital purchase request made by a consumer (the data comprising a token, an amount associated with the transaction, a promotional code for each item included in the digital purchase request associated with a promotion, a default transaction amount, and a single default promotional code) is received from a merchant server. The single default promotional code is assigned to all items included in the digital purchase request that are associated with promotions. Using the token, account information associated with the consumer is retrieved from a database. For each promotional code received, promotional information is retrieved. The retrieved promotional information is displayed. The digital purchase request is submitted for processing using the single default promotional code.

18 Claims, 4 Drawing Sheets

301 302 303 304 305 305 306 307 307 308 309 309 310 311 311 312 313

(56) References Cited

U.S. PATENT DOCUMENTS

| | | | | |
|---|---|---|---|---|
| 8,019,362 | B2 * | 9/2011 | Sweatman | H04W 88/184 455/466 |
| 8,073,424 | B2 * | 12/2011 | Sun | G06Q 20/326 455/406 |
| 8,086,534 | B2 * | 12/2011 | Powell | G06Q 40/02 705/64 |
| 8,109,444 | B2 * | 2/2012 | Jain | G06K 19/07707 235/487 |
| 8,127,984 | B2 * | 3/2012 | Zatloukal | G06K 19/0723 455/73 |
| 8,214,454 | B1 * | 7/2012 | Barnes | G06F 16/955 709/217 |
| 8,751,314 | B2 * | 6/2014 | Fisher | G06Q 20/325 235/382 |
| 9,275,387 | B1 | 3/2016 | Spector et al. | |
| 9,848,052 | B2 | 12/2017 | Kumnick | |
| 10,489,765 | B2 * | 11/2019 | Priebatsch | G06Q 30/0619 |
| 2018/0053183 | A1 * | 2/2018 | Kuncl | G06Q 30/0601 |

OTHER PUBLICATIONS

Office Action dated Jun. 25, 2019 in U.S. Appl. No. 15/387,993.
Office Action dated Aug. 4, 2020 in U.S. Appl. No. 15/387,993.
Notice of Allowance dated Mar. 23, 2021 in U.S. Appl. No. 15/387,993.

* cited by examiner

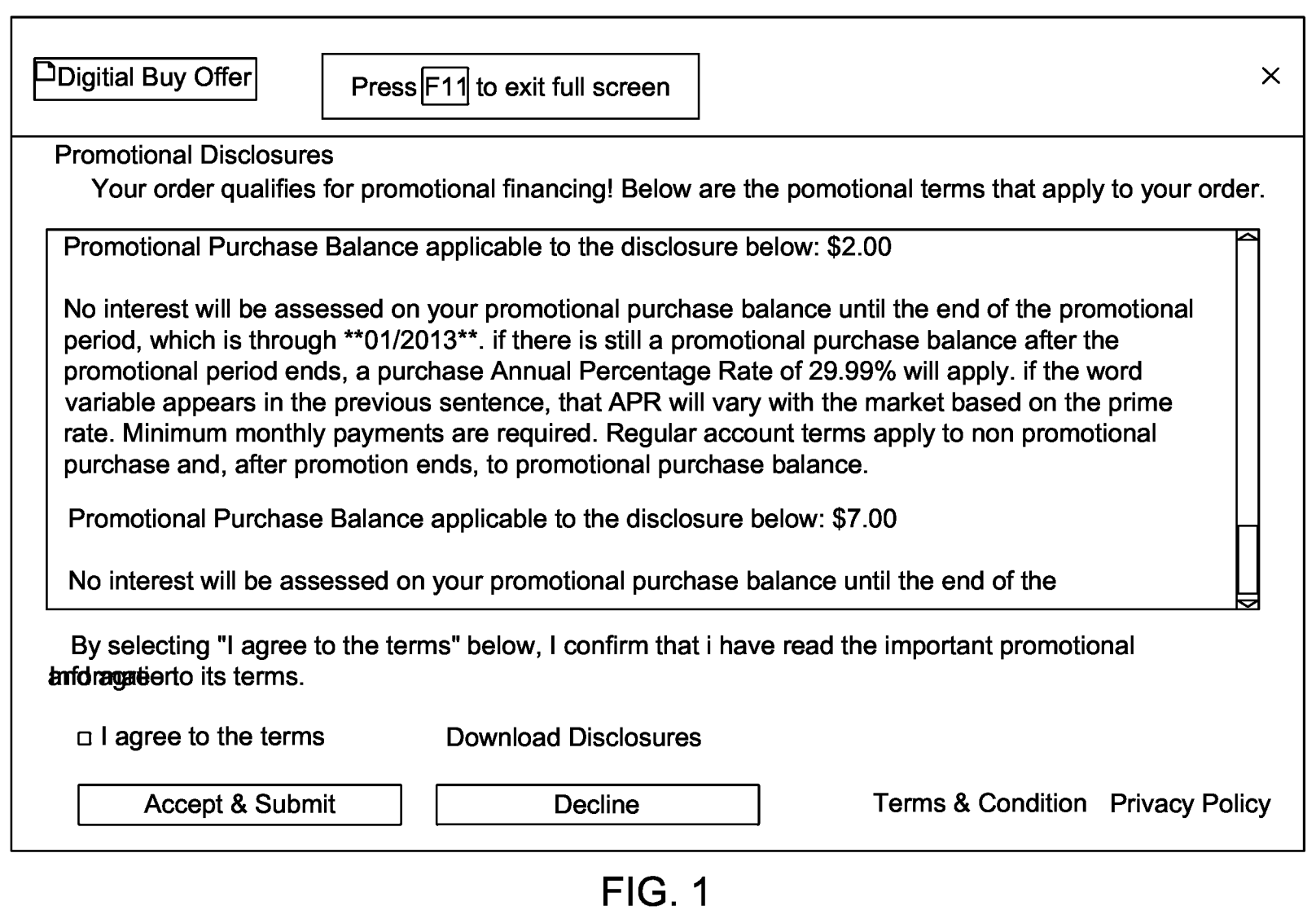

Digitial Buy Offer

Press F11 to exit full screen

×

Promotional Disclosures

Your order qualifies for promotional financing! Below are the pomotional terms that apply to your order.

Promotional Purchase Balance applicable to the disclosure below: $2.00

No interest will be assessed on your promotional purchase balance until the end of the promotional period, which is through 01/2013. if there is still a promotional purchase balance after the promotional period ends, a purchase Annual Percentage Rate of 29.99% will apply. if the word variable appears in the previous sentence, that APR will vary with the market based on the prime rate. Minimum monthly payments are required. Regular account terms apply to non promotional purchase and, after promotion ends, to promotional purchase balance.

Promotional Purchase Balance applicable to the disclosure below: $7.00

No interest will be assessed on your promotional purchase balance until the end of the By selecting "I agree to the terms" below, I confirm that i have read the important promotional information and I agree to its terms.

☐ I agree to the terms

Download Disclosures

Accept & Submit

Decline

Terms & Condition

Privacy Policy

FIG. 1

SYSTEM AND METHOD FOR PROCESSING OF PROMOTIONS IN CONNECTION WITH DIGITAL PURCHASING

CROSS-REFERENCE TO RELATED APPLICATIONS

This application is a continuation of U.S. Provisional application Ser. No. 15/387,993, filed Dec. 22, 2016, which is hereby incorporate by reference, in its entirety and for all purposes.

FIELD OF THE INVENTION

The invention relates to processing of promotions in connection with digital purchasing.

BRIEF SUMMARY OF THE INVENTION

In accordance with embodiments of the present invention, there is provided a system and method for processing promotions in connection with digital purchasing. Data associated with a digital purchase request made by a consumer (the data comprising a token, an amount associated with the transaction, a promotional code for each item included in the digital purchase request associated with a promotion, a default transaction amount, and a single default promotional code) is received from a merchant server. The single default promotional code is assigned to all items included in the digital purchase request that are associated with promotions. Using the token, account information associated with the consumer is retrieved from a database. For each promotional code received, promotional information is retrieved. The retrieved promotional information is displayed. The digital purchase request is submitted for processing using the single default promotional code.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 1 is a screen shot of an exemplary interface displaying promotional notifications to an end user;

DETAILED DESCRIPTION OF THE PREFERRED EMBODIMENTS

Figure 2:
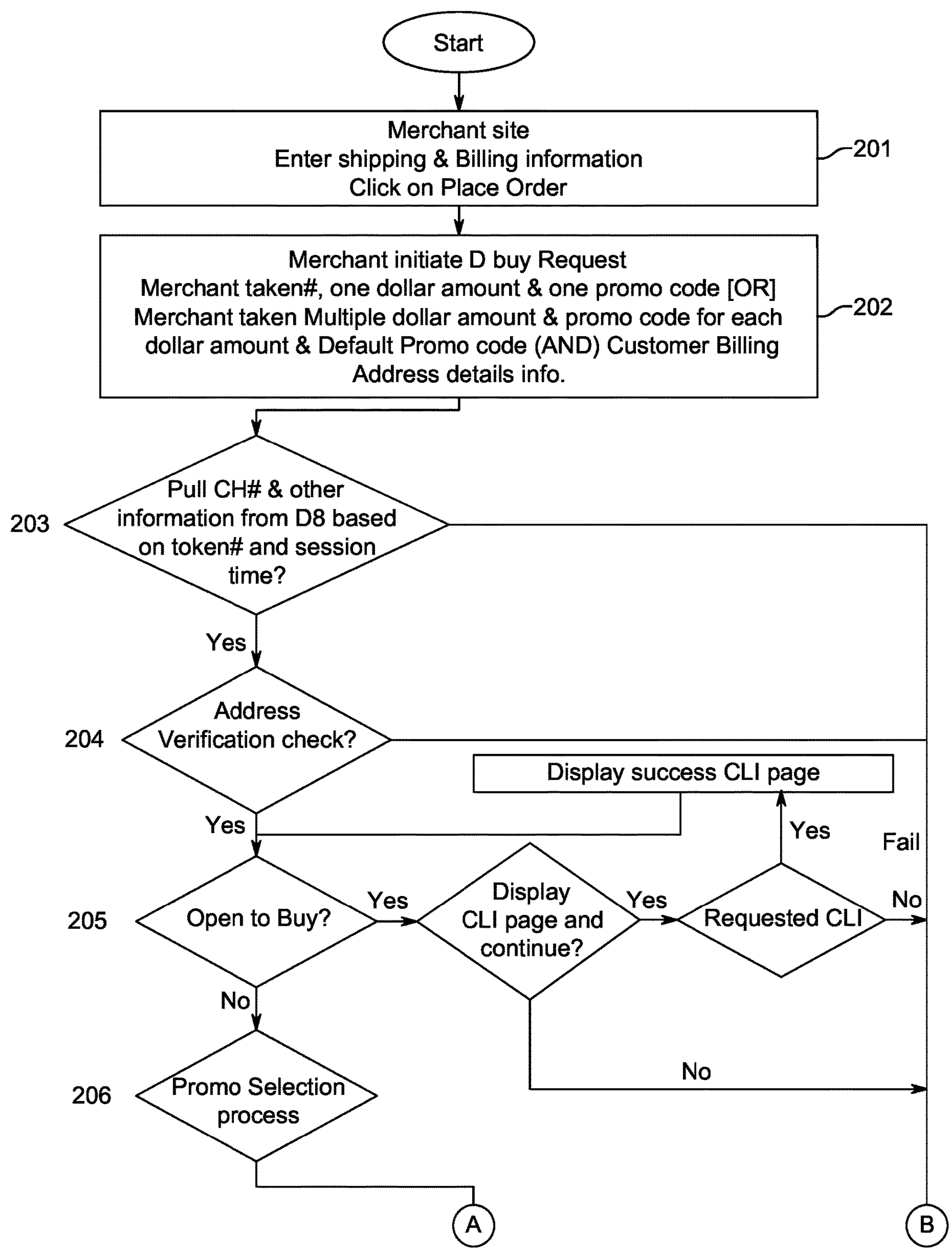
FIG. 2 is a flow chart illustrating an exemplary method of the present invention.
Figure 2:
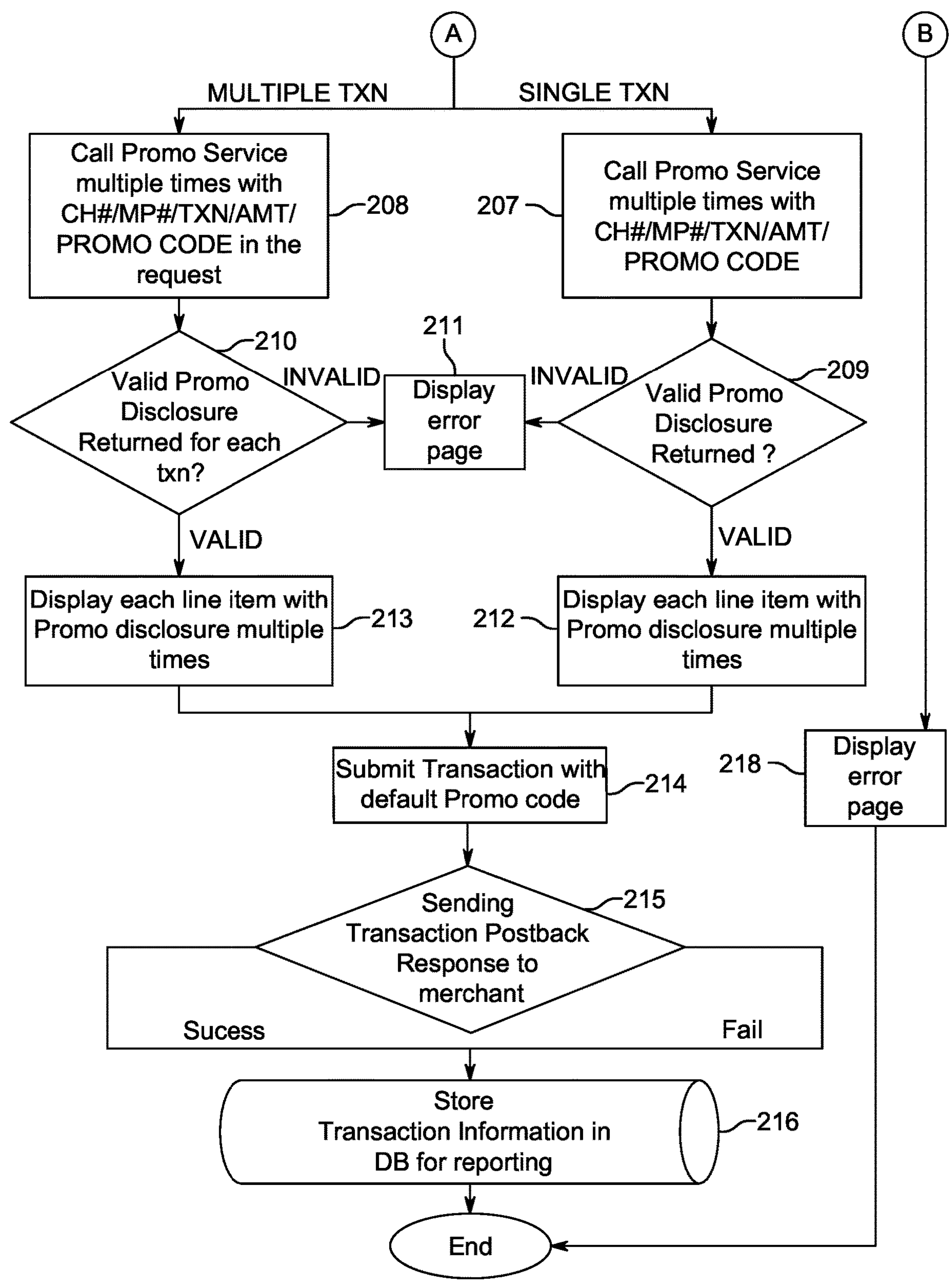

The systems and methods of the present invention operate in the environment of a merchant's online store. More particularly, when a consumer indicates his intent to make a purchase through the online store, a new payment option is presented to the consumer. The payment option may be presented, in one embodiment, as a "buy button" or other indicator. The payment option involves an extension of credit by a bank or other financial institution. In the preferred embodiment, the "buy button" features the merchant's own branding, not the branding of the entity extending the credit. The payment option comprises an opportunity to pay for a purchase, digitally, using a private label credit card or a dual card (i.e., a credit card that is capable of processing both private label credit card transactions through a private network and bank card transactions through a bankcard network). The payment option is presented to the consumer, in an exemplary embodiment, at the point of electronic purchase, such as with the electronic shopping card or on the checkout page. In a preferred embodiment, the payment option is presented by way of a modal window.

With regard to the consumer's purchases from the merchant, the merchant may present to the consumer one or more promotional offers, associated with one or more of the items to be purchased by the consumer. For example, for certain items to be purchased (e.g., large appliances), 6 month interest free credit may offered to the consumer. For other items to be purchased (e.g., small appliances), a reduced interest rate may be charged for a certain period (e.g., 6 months).

By law, advanced promotional notifications must be presented to the consumer, with terms and conditions that must be reviewed and/or accepted, in connection with the presented promotional offers. Such advanced promotional notifications may also be displayed in a modal window, in an exemplary embodiment. FIG. 1 presents an example of an advanced promotional notification.

Referring now specifically to the present invention, in accordance therewith, multiple promotions may be processed in connection with a single digital buy request made by the consumer. For example, the consumer may be purchasing multiple items in a single digital buy request, at least several of which items are associated with a promotion. In accordance with the present invention, when processing the digital buy request, a single default promotional code is used for the single digital buy request comprising multiple promotions, rather a promotional code for each promotion. All advanced promotion notifications are displayed in the same modal window, in the exemplary embodiment (see FIG. 1).

The invention is carried out using a computer system and improves the operation of the computer system in several ways. For example, reducing the number of transactions that need to be run to process the promotions (i.e., processing multiple promotions using a single default promotional code rather than using multiple promotional codes) reduces the overall processing requirements of the computer, thereby increasing its operating efficiency. More particularly, processing time is reduced because the system is making one call to the backend system instead of multiple calls. Thus, for example, if there are three promotions, one call is made instead of three which reduces processing time by 200%. Further, implementation of the invention in the digital buying context described herein also reduces failure points and refund problems. Once an item is shipped to the customer, the merchant settles the transaction. The merchant may use multiple promotions per transaction using the inventive system and settles each promotion for the correct purchase amount through the settlement process. This process avoids issues if there is an invalid promotional code provided or if there is a connection issue between calls. Thus, for example, if the system were required to making three calls (e.g., for three promotions), and two of those calls were successful and one was not, then the two previous calls would need to be reversed. If the third call failed due to connection issues, then there would be no way to reverse and the customer has now been charged for only part of an order with no way for them to complete the full order or get a refund. Using only one default promotional code removes these issues.

With reference to FIG. 2, an exemplary process illustrating the methods of the present invention is now described. Once the consumer confirms the billing and shipping information for his purchase with the merchant server, in step 201, the merchant server sends a request to the transaction processing server that includes the following data, in step 202:

Token
Address1
Address2
City
State
Zipcode
Phone number
Transaction amount(s)
Promocode(s)
Default Transaction amount (i.e., the total transaction amount, which is the sum of all other transaction amounts; it is used for the one call with the default promo code).
Default Promo Code The transaction processing server receives the account information from the database for the token passed by the merchant server, in step 203. An address check is conducted in step 204. In step 205, the amount of credit that is available to make a purchase on the customer's account is determined, as well as whether a credit line increase is available. Failure at any of steps 203, 204, and 205 will result in an error message being displayed, in step 218.

In step 206, the promotion selection process commences. In connection with this, the merchant has previously sent the promotional information. The system retrieves all eligible promotions for the merchant, the account number, and transaction amount, and then matches that information with what was sent to us by the merchant. The system then knows what promotional language to display to the customer and if the promotion sent by the merchant is valid. If the purchase involves a single transaction, in step 207, the transaction processing server makes a call to obtain the eligible promotional information for the promotion associated with the promotional code passed by the merchant server. If the purchase involves multiple transactions, at least several of which are associated with different promotions, the transaction processing server makes multiple calls (i.e., one for each transaction) to obtain the promotion information for the promotion associated with the promotional codes, in step 208. In step 209, it is determined whether a valid promotional disclosure is returned. If not, the transaction processing server displays an error message in step 211. In step 210, it is determined whether a valid promotional disclosure is returned for each transaction. If not, the transaction processing server displays the error message in step 211. If a valid promotional disclosure is returned, the promotional disclosure for the single transaction is displayed, in step 212. Similarly, for multiple transactions, if valid promotional disclosures are returned, the promotional disclosures are displayed for each line item, in step 213. The consumer accepts the terms and conditions of each of the promotions by checking the "I agree to the terms" checkbox and clicking on the "Accept & Continue" button, or other suitable manner of indicating acceptance in a digital transaction. The disclosures may be downloaded by the consumer by clicking on the download disclosures button. In step 214, the transaction is submitted to the transaction processing server with a default promotional code for all transactions involved in the digital buy request. In step 215, the system sends back information about the transaction to the merchant (e.g., if the transaction was approved, declined, or if there was an error, by way of example, so that the merchant can proceed accordingly when the customer is returned to the merchant. Information regarding the processing of the transaction is stored, in step 216.

Figure 3:
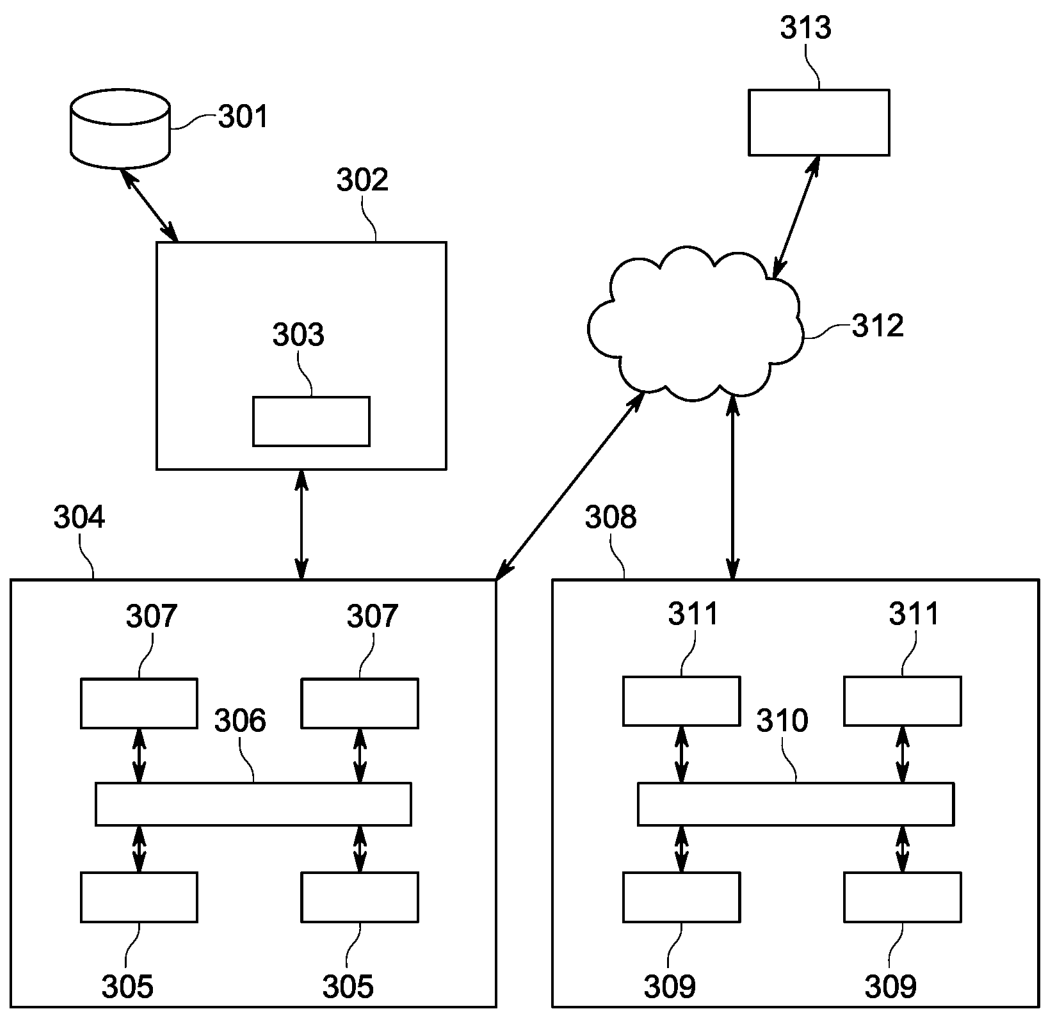
FIG. 3 is an exemplary computer architecture for carrying out the methods of the present invention.

An exemplary computer system that may be used in connection with the present invention is described with reference to FIG. 3.

In some embodiments, the methods are carried out by a system that employs a client/server architecture. Such exemplary embodiments are described as follows with reference to FIG. 3. The data that may be used in connection with processing a digital buy request may be stored in one or more databases 301. Database server(s) 302 may include a database services management application 303 that manages storage and retrieval of data from the database(s) 301. The databases 301 may be relational databases; however, other data organizational structure may be used without departing from the scope of the present invention.

One or more application server(s) 301 are in communication with the database server 302. The application server 304 communicates requests for data to the database server 302. The database server 302 retrieves the requested data. The application server 304 may also send data to the database server 302 for storage in the database(s) 301. The application server 304 comprises one or more processors 305, non-transitory computer readable storage media 307 that store programs (computer readable instructions) for execution by the processor(s), and an interface 306 between the processor(s) 305 and computer readable storage media 307. The application server 304 may store the computer programs referred to herein.

To the extent data and information is communicated over a network (e.g., the Internet or an Intranet), one or more network servers 308 may be employed. The network server 308 also comprises one or more processors 309, computer readable storage media 311 that store programs (computer readable instructions) for execution by the processor(s), and an interface 310 between the processor(s) 309 and computer readable storage media 311. The network server 308 is employed to deliver content that can be accessed through the communications network 312, e.g., by an end user employing computing device 313. When data is requested through an application, such as an Internet browser, the network server 308 receives and processes the request. The network server 308 sends the data or application requested along with user interface instructions for displaying a user interface on device 313. Thus, for example, a user may employ device 313 to configure a template and/or input data into a configured form.

The computers referenced herein are specially programmed to perform the functionality described herein.

The non-transitory computer readable storage media (e.g., 307 or 311) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concept thereof. It is understood, therefore, that this invention is not limited to the exemplary embodiments shown and described.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

What is claimed is:

1. A computer-implemented method, comprising:

receiving a digital buy request, wherein the digital buy request is associated with an account number, a default transaction amount, a token, and a plurality of items associated with a plurality of promotions, wherein when the digital buy request is received from a merchant associated with the token, the plurality of items and the plurality of promotions are determined from a database association between the token, the plurality of items, and the plurality of promotions;

determining a single default promotional code, wherein the single default promotional code is associated with the plurality of items, and the plurality of promotions, wherein the single default promotional code is associated with the default transaction amount, and wherein the default transaction amount is a sum of all transaction amounts associated with the digital buy request;

associating the account number, the default transaction amount, and the single default promotional code with a transaction, wherein the single default promotional code facilitates a reduction in failures caused by a connectivity issue or invalid promotional codes for the plurality of promotions in the transaction;

transmitting the digital buy request, wherein the digital buy request is transmitted as a server call to obtain eligible promotional information for each of the plurality of promotions associated with the single default promotional code, wherein the digital buy request is further transmitted to determine that the plurality of promotions are valid, wherein when the single default promotional code is received at an application server, the single default promotional code is processed as part of the transaction to identify one or more of the plurality of promotions for the transaction; and providing promotional disclosure information for each of the plurality of promotions.

2. The computer-implemented method of claim 1, wherein processing promotions using the single default promotional code reduces an overall processing time associated with the digital buy request.

3. The computer-implemented method of claim 1, further comprising:

storing processing information associated with processing promotions using the single default promotional code.

4. The computer-implemented method of claim 1, wherein providing the promotional disclosure information for each of the plurality of promotions includes facilitating display of the promotional disclosure information on a client device.

5. The computer-implemented method of claim 1, wherein the promotional disclosure information includes an error message for at least one of the plurality of promotions.

6. The computer-implemented method of claim 1, further comprising receiving a terms and conditions acceptance communication associated with the plurality of promotions.

7. A device, comprising:

a memory; and one or more processors coupled to the memory, the one or more processors configured to perform operations comprising:

receiving a digital buy request, wherein the digital buy request is associated with an account number, a default transaction amount, a token, and a plurality of items associated with a plurality of promotions, wherein when the digital buy request is received from a merchant associated with the token, the plurality of items and the plurality of promotions are determined from a database association between the token, the plurality of items, and the plurality of promotions;

determining a single default promotional code, wherein the single default promotional code is associated with the plurality of items, and the plurality of promotions, wherein the single default promotional code is associated with the default transaction amount, and wherein the default transaction amount is a sum of all transaction amounts associated with the digital buy request;

associating the account number, the default transaction amount, and the single default promotional code with a transaction, wherein the single default promotional code facilitates a reduction in failures caused by a connectivity issue or invalid promotional codes for the plurality of promotions in the transaction;

transmitting the digital buy request, wherein the digital buy request is transmitted as a server call to obtain eligible promotional information for each of the plurality of promotions associated with the single default promotional code, wherein the digital buy request is further transmitted to determine that the plurality of promotions are valid, wherein when the single default promotional code is received at an application server, the single default promotional code is processed as part of the transaction to identify one or more of the plurality of promotions for the transaction; and providing promotional disclosure information for each of the plurality of promotions.

8. The device of claim 7, wherein processing promotions using the single default promotional code reduces an overall processing time associated with the digital buy request.

9. The device of claim 7, wherein the one or more processors are configured for operations further comprising:

storing processing information associated with processing promotions using the single default promotional code.

10. The device of claim 7, wherein providing the promotional disclosure information for each of the plurality of promotions includes facilitating display of the promotional disclosure information on a client device.

11. The device of claim 7, wherein the promotional disclosure information includes an error message for at least one of the plurality of promotions.

12. The device of claim 7, wherein the one or more processors are configured for operations further comprising:

receiving a terms and conditions acceptance communication associated with the plurality of promotions.

13. A non-transitory computer readable storage medium comprising instructions that, when executed by one or more processors of a device, cause the device to perform operations comprising:

receiving a digital buy request, wherein the digital buy request is associated with an account number, a default transaction amount, a token, and a plurality of items associated with a plurality of promotions, wherein when the digital buy request is received from a merchant associated with the token, the plurality of items and the plurality of promotions are determined from a database association between the token, the plurality of items, and the plurality of promotions;

determining a single default promotional code, wherein the single default promotional code is associated with the plurality of items, and the plurality of promotions, wherein the single default promotional code is associated with the default transaction amount, and wherein the default transaction amount is a sum of all transaction amounts associated with the digital buy request;

associating the account number, the default transaction amount, and the single default promotional code with a transaction, wherein the single default promotional code facilitates a reduction in failures caused by a connectivity issue or invalid promotional codes for the plurality of promotions in the transaction;

transmitting the digital buy request, wherein the digital buy request is transmitted as a server call to obtain eligible promotional information for each of the plurality of promotions associated with the single default promotional code, wherein the digital buy request is further transmitted to determine that the plurality of promotions are valid, wherein when the single default promotional code is received at an application server, the single default promotional code is processed as part of the transaction to identify one or more of the plurality of promotions for the transaction; and providing promotional disclosure information for each of the plurality of promotions.

14. The non-transitory computer readable storage medium of claim 13, wherein processing promotions using the single default promotional code reduces an overall processing time associated with the digital buy request.

15. The non-transitory computer readable storage medium of claim 13, wherein the instructions cause the one or more processors to perform operations further comprising:

storing processing information associated with processing promotions using the single default promotional code.

16. The non-transitory computer readable storage medium of claim 13, wherein the promotional disclosure information for each of the plurality of promotions includes facilitating display of the promotional disclosure information on a client device.

17. The non-transitory computer readable storage medium of claim 13, wherein the promotional disclosure information includes an error message for at least one of the plurality of promotions.

18. The non-transitory computer readable storage medium of claim 13, wherein the instructions cause the one or more processors to perform operations further comprising:

receiving a terms and conditions acceptance communication associated with the plurality of promotions.

* * * * *